United States Patent
Mukasa (12)

(10) Patent No.: US 6,592,785 B1
(45) Date of Patent: Jul. 15, 2003

(54) DEVICE AND METHOD FOR MOLDING OPTICAL COMPONENTS

(75) Inventor: Katsunori Mukasa, Urawa (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/534,051

(22) Filed: Mar. 24, 2000

(30) Foreign Application Priority Data

Mar. 29, 1999 (JP) .......................................... 11-085492

(51) Int. Cl.⁷ .............................................. B29D 11/00
(52) U.S. Cl. ............................. 264/2.2; 65/64; 65/102; 65/29.11; 264/40.5; 425/149; 425/808
(58) Field of Search ................................. 264/2.2, 40.5; 425/135, 149, 808; 65/29.1, 104, 64, 102, 111, 29.11

(56) References Cited

U.S. PATENT DOCUMENTS

| 3,642,405 | A | | 2/1972 | Eggenberger et al. |
|---|---|---|---|---|
| 4,120,185 | A | * | 10/1978 | Schneider et al. |
| 4,195,048 | A | | 3/1980 | Jung |
| 4,554,001 | A | | 11/1985 | Shields et al. |
| 4,734,869 | A | | 3/1988 | Mickowski |
| 4,836,838 | A | | 6/1989 | Hirota et al. |
| 4,836,840 | A | | 6/1989 | Hirota et al. |
| 5,023,770 | A | * | 6/1991 | Siverling |
| 5,062,052 | A | * | 10/1991 | Sparer et al. ............... 425/135 |
| 5,421,849 | A | | 6/1995 | Hirota |
| 5,894,005 | A | | 4/1999 | Steel et al. |
| 6,047,579 | A | * | 4/2000 | Schmitz |

* cited by examiner

Primary Examiner—Mathieu D. Vargot
(74) Attorney, Agent, or Firm—Arnold International; Clyde I. Coughenour; Bruce Y. Arnold

(57) ABSTRACT

An optical component molding device and method is disclosed. The molding device includes a heating section, a heating/pressing section, and a cooling section. A carrying member sequentially conveys molding units between these treatment sections. Either the molding units or the carrying member is provided with coded information pertaining to the treatment each molding unit is to receive. A sensor scans the coded information and relays it to a master control unit that controls the operation of the various sections. The device automatically accommodates different height molds, as well as allows for different length pressing strokes, as well as different pressures, temperatures and rates of heating and cooling, and different durations of pressing to be individually controlled for each mold unit.

19 Claims, 3 Drawing Sheets

DEVICE AND METHOD FOR MOLDING OPTICAL COMPONENTS

BACKGROUND OF THE INVENTION

1. Field of the Invention

The present invention uses information stored in, or associated with, a mold unit to inform a master control unit of the length of a pressing stroke, the duration of pressing, the mold temperature, etc., in order to control the optical component molding device and to properly form an optical component.

2. Description of Related Art

Conventionally, optical components such as crown glass or flint glass lens elements have been produced by grinding and polishing so as to attain a specially designed lens surface. Recently, lens elements with comparatively small diameters have been produced by a "press-molding" method.

One common way to mold optical components is to heat an optical material to its plastic state and press it between shaped mold surfaces. FIG. 1 is an example of a prior art molding device 20. An upper mold 21 is driven relative to a lower mold 22 within a guide cylinder 23. An optical material 30 is pressed between the upper and lower molds to impress the shape of the mold surfaces 21a and 22a onto the optical material, after which the optical material hardens by being allowed to cool. With this configuration, a hydraulic drive, compressed-air drive, or the like (not shown) drives the upper mold 21 and the lower mold 22 toward each other. The guide cylinder 23 is used to confine the optical material and to accurately align the surface 21a of the upper mold 21 with the surface 22a of the lower mold 22 as the upper and lower molds come together.

When performing press molding, the optical material 30 is placed onto the surface 22a of the lower mold 22, and a heating unit (not shown) heats the materials. Heating is continued until the temperature of the glass reaches the transition point of the glass or until a higher temperature is reached. The heating softens the optical material 30, causing it to become plastic. Once in the plastic state, a hydraulic or compressed-air driven drive mechanism (not shown) lowers the upper mold 21, thus applying pressure to the optical material 30. By this means, the optical material 30 is molded with particular lens element surfaces as a result of being pressed between the lower mold surface 22a and the upper mold surface 21a. Subsequently, the optical material is allowed to gradually cool, the upper mold 21 is raised by the drive mechanism, and the molded lens element is removed from the lower mold 22. U.S. Pat. No. 4,836,840 to S. Hirota et al, is an example of such a prior art mold unit.

In the above conventional molding method, the mold surfaces will eventually become rough after repeated increases and decreases in temperature and being pressed against the optical material. When this roughening occurs, the lens elements will no longer be molded with a desired predetermined accuracy of surface profile. To correct this, the mold surfaces are treated by grinding and/or polishing, or the like, in order to restore the desired surface profile of the mold surface. After such a procedure, the height of the mold, that is the distance between the top and bottom of the molds 21, 22 is reduced. Since the amount of grinding and/or polishing, or the like, for correcting each mold surface is different, the height of each mold after correction will vary from mold to mold.

In the above-described conventional molding method, pressing is routinely carried out by lowering the upper mold 21, with an air-pressure mechanism or the like, by a predetermined distance. Even if a fixed-height pressing stroke (i.e., pressing to a fixed location) is suitable for a mold 20 with an initial height, since the height of the mold decreases after the above-noted correction, the fixed location will be above that needed because of the reworked mold having a reduced height. Thus the pressing stroke must be adjusted or it will cause errors in the shape, size and thickness of the finished lenses.

Frequently, the operator of a molding device has dealt with this problem by marking each mold and then manually adjusting the distance the upper mold is lowered by the air-pressure mechanism each time it is used. This method has been inefficient and precludes the ability to reduce the manufacturing costs of the lenses.

The present invention overcomes the aforementioned problems by adjusting the length of a pressing stroke to accommodate that needed for each mold by reading coded information associated with each mold. The present device operates smoothly with molds of different heights and improves the efficiency of the press-molding operation.

It is common to intermittently feed molds through compartmented treatment sections. U.S. Pat. Nos. 4,836,838 to S. Hirota et al and 5,421,849, to S. Hirota are examples. It is also well known that molding apparatus can be operated using computer controls. U.S. Pat. Nos. 4,554,001 to Shields et al and 4,734,869 to Mickowski, are examples of computer controls of molding apparatus. U.S. Pat. No. 3,642,405 to Eggenberger et al, teaches adjustment of a pressing stroke according to a predetermined range. U.S. Pat. No. 5,894,005 to G. Steel et al, identifies individually molded articles by applying identification indicia. U.S. Pat. No. 4,195,048 to Jung compensates for different height molds by the use of absolute-coded angle indicators that adjust the machine after a new mold is inserted.

BRIEF SUMMARY OF THE INVENTION

In order to solve these problems, the molding device of the present invention includes a mold composite body having a conventional molding unit, such as shown in FIG. 1 with an upper and lower mold and a guide cylinder, as well as a carrying unit for carrying the mold unit along a predetermined path. The path takes the mold unit past a heating section, for heating the mold unit to a predetermined temperature; a heating/pressing section for additional heating and pressing the optical material by driving the first mold and the second mold together; and a cooling section, which solidifies the optical material. At a minimum, pressing information is stored in or on the mold unit or its carrying member. This information is read by a scanning unit prior to the time the pressing stroke occurs and is input to a control unit. A pressing is performed under the control of the control unit, such as a computer, in response to the information.

The information provided with the molding unit to be read by the reading device of the molding control unit can relate to various different molding parameters. These can include one or more of pressing-stroke pressure, pressing stroke distance, pressing duration, temperature, temperature application time, and so on. The information can be relayed to various treatment units placed at various positions associated with the molding device.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

By use of the device and method of the invention, different height molds can mold the same optical material into optical components of the same or different configurations. The same temperature or different temperatures can be used, or the same or different optical materials can be molded using different pressures and temperatures for different time periods.

Figure 2:
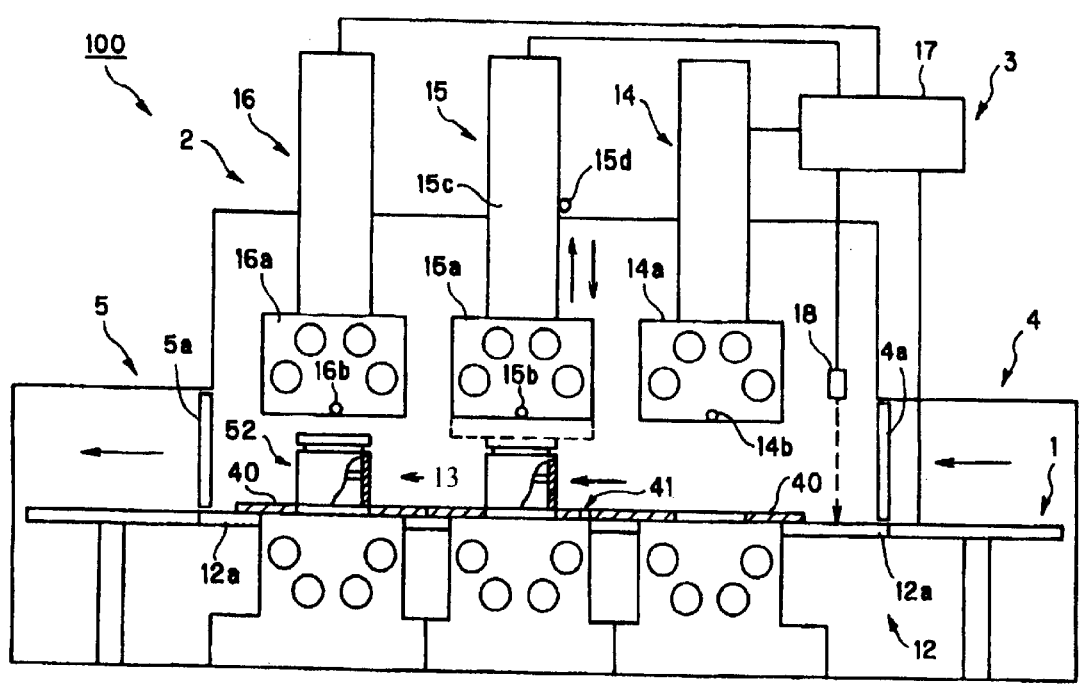
FIG. 2 is a schematic view of a molding device showing a mold carrying member and sections of the molding device.

FIG. 2 shows a schematic view of a lens-molding device for practicing the present invention. The lens-molding device 100 includes a carrying section 1, a molding enclosure 2, a controlling section 3, a loading section 4, and an unloading section 5.

The carrying section 1 has a carrying mechanism 12. The carrying mechanism 12 includes a driving source, such as a push rod, an air-pressure cylinder and piston mechanism, an electric motor and the like (not shown), and a power transmission mechanism, including an appropriate assembly of conventional mechanical elements, such as a gear, a chain and a cam, or the like (not shown). The carrying mechanism 12 includes a mount or support 12a over which work is pushed from the right to the left in a horizontal direction 13.

The molding enclosure 2 includes a heating section 14, a heating/pressing section 15 and a cooling section 16. The heating section 14 has a heating unit 14a, such as an electric heater that can heat up to a predetermined temperature set by a control unit 17, and a temperature sensor 14b. The heating/pressing section 15 has a heating unit 15a, such as an electric heater, a temperature sensor 15b, an air-pressure driving unit 15c and height sensor 15d. The heating/pressing section can maintain a predetermined high temperature set by the control unit 17. The air-pressure driving unit 15c is lowered to a predetermined position or to exert a predetermined pressure under conditions set by the control unit. The cooling section 16 has a temperature control unit 16a, such as an air conditioner and electric heater and a temperature sensor 16b. The temperature lowering rate and amount is set by the master control unit 17.

The controlling section 3 has a computer with input from the read sensor 18 and temperature sensors. The computer includes a CPU (Central Processing Unit), ROM (Read Only Memory), and RAM (Random Access Memory) (not shown). The CPU is connected to each section of the molding enclosure 100 for controlling the operation of each section within the molding enclosure. The CPU is also connected to a host computer (not shown) for controlling the entire lens molding manufacturing process. The ROM (not shown) is a storage unit for storing a control program, known data and the like of the CPU. The RAM (not shown) is a storage unit for temporarily storing computed data. The read sensor 18 is a device that detects information associated with the molding units or their associated carrying member. As an example, the sensor can emit laser beams or the like and can read information by receiving all or portions of these beams on the opposite side of the mold units or their associated carrying members.

The loading section 4 and unloading section 5 are separated from the molding enclosure 2 by shutters or swinging doors 4a, 5a. The mold units are loaded and unloaded at these sections or are placed in the carrying member 40 at these sections. The carrying member 40 is supported by mount means or supports 12a that permit the carrying member to slide or roll over the mount means.

Figure 1:
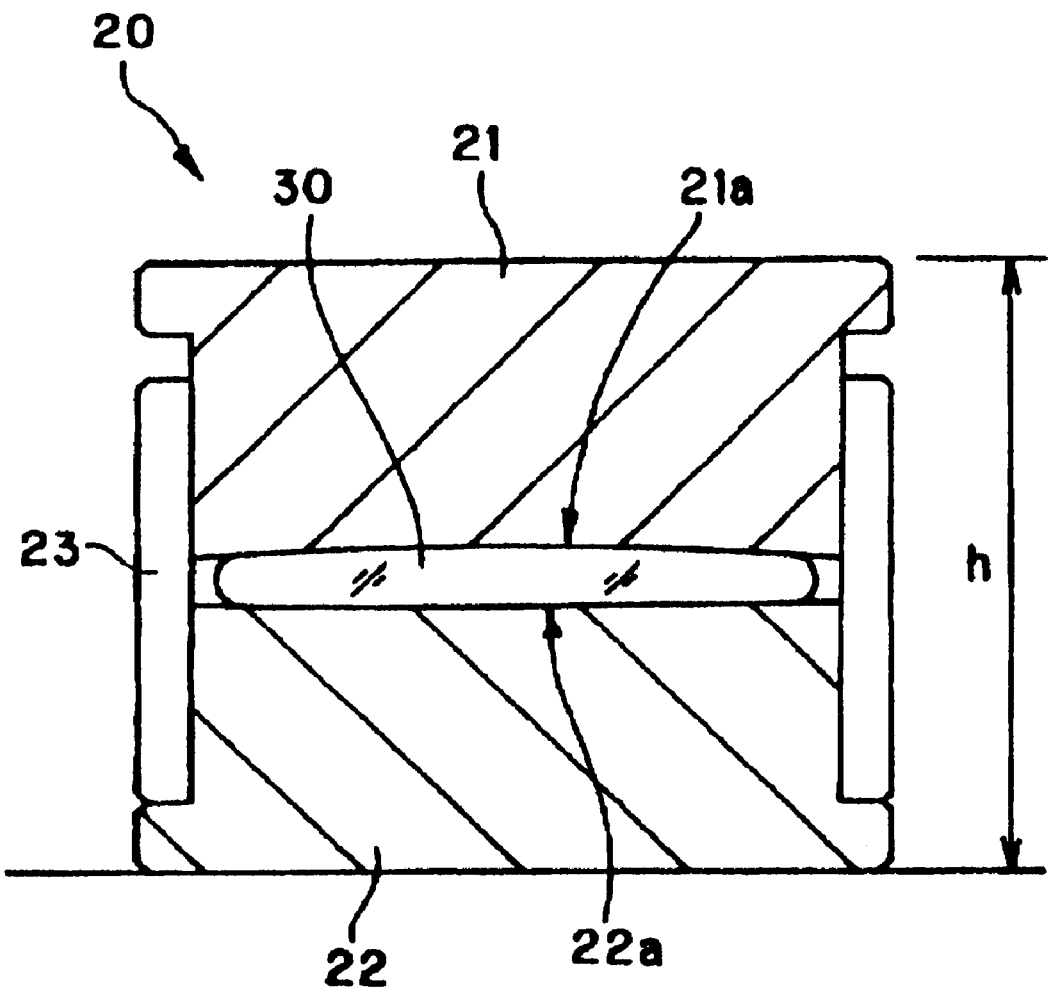
FIG. 1 is a cross-sectional view of a typical mold unit of the prior art.
Figure 3:
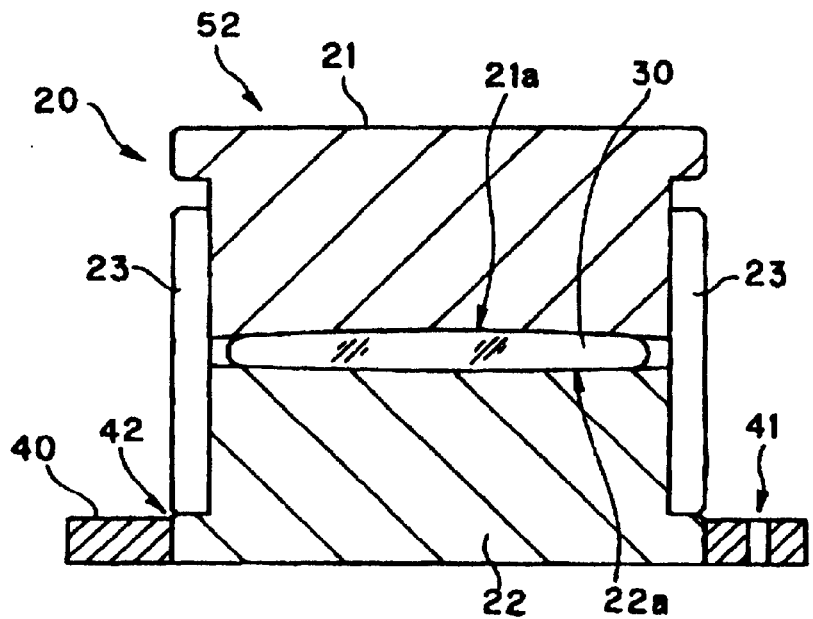
FIG. 3 is a cross-sectional view of a typical mold unit in combination with a carrying member for the mold unit.
Figure 4:
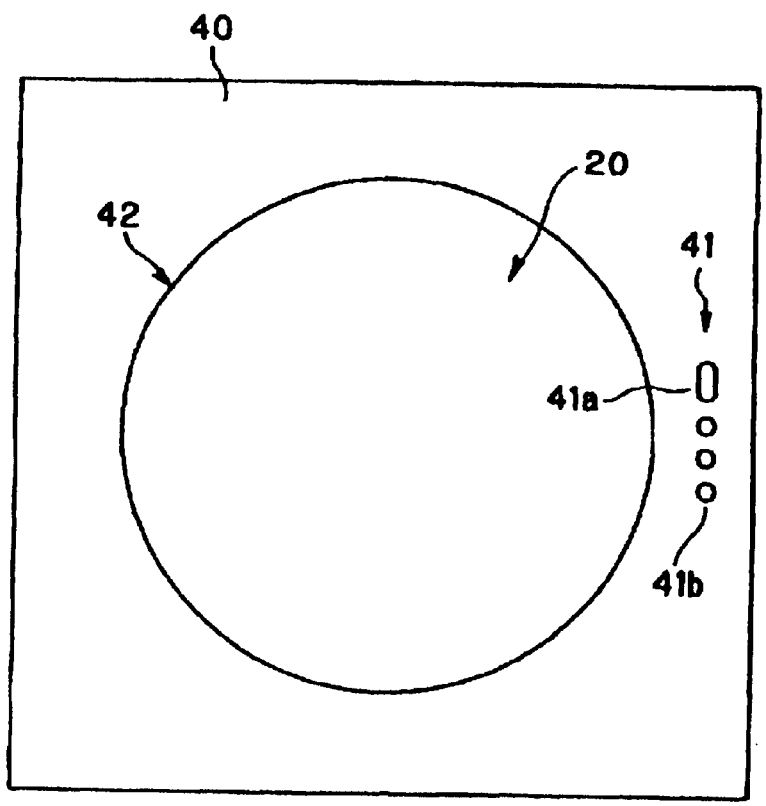
FIG. 4 is a top view of a mold unit held in a carrying member with information provided on the carrying member.

FIG. 3 shows a mold and a carrying section that can be used for molding lenses according to the present invention. As shown in FIG. 2, the lens-molding device 100 includes a mold composite body 52 that includes both the mold unit and carrying member. The mold unit 20 is used essentially as in the prior art. As with the prior art mold unit 20, shown in FIG. 1, an optical material 30 is arranged between upper mold 21 and lower mold 22. The upper and lower molds have a combined height h. One or more mold units 20 are joined with the carrying member 40. The lower mold 22 is shown joined to a holding mouth 42 of the carrying member 40. FIG. 4 is a top view of a molding unit and a carrying member. As can be seen in the carrying member 40, an information or pressing code 41 is formed to provide information on one or more of the parameters to be used by the heating, heating/pressing, and cooling sections in the molding enclosure 2 under computer control. The pressing code 41 is shown provided by a combination of four through-pores or apertures including one oval pore or aperture 41a and three circular pores or apertures 41b.

The mold composite body 52 receives the optical material 30 in the mold unit 20 that is held by the carrying member 40. The carrying member and mold composite body are taken through the shutter 4a of loading section 4 of the lens-molding device 100 into the lens-molding enclosure 2. The mold composite body is shifted onto the mount 12a, and pushed to the left by a push rod (not shown). When the carrying member and/or mold unit is moved from the loading section 4 and passed under the read sensor 18, the information or pressing codes 41 provided are scanned and relayed to the computer 17. The carrying member is sequentially and intermittently moved to the left so that each mold unit spends either a predetermined, or information-amount-dictated, time under each treating section.

In the code means used, the oval aperture 41a and circular apertures 41b indicate "1" or "0", respectively (one bit of information may be expressed), depending on whether the aperture shape is oval 41a or circular 41b. By the combination of four through-pores, four bits or sixteen different pieces of information may be expressed. This information or pressing code gives the distance the pressing unit is to be lowered by air-pressure driving unit 15c of the heating/pressing section 15. A specific code is associated with a specific mold and includes pressing-stroke distance as well as any other information peculiar to that particular mold. In any event, the read sensor 18 scanning the aperture codes transmits detected signals to the master control unit 17. The master control unit 17 recognizes the four-bit code 41 signals transmitted from the read sensor 18, and determines the distance the air-pressure driving unit 15c at the heating/pressing section 15 is to be lowered as well as other molding parameters to be controlled.

The carrying mechanism 12 moves the mold composite body 52 including the molds across the lens-molding device under the treatment sections 14,15,16 by being pushed by a push rod (not shown). The mold composite body 52 is heated at the heating section 14 to a predetermined temperature (above the glass transition point) by the heating unit 14a under control of the master control unit 17. As a result, the optical material 30 in the mold unit 20 is plasticized. The temperature sensor 14b is used to detect this temperature and relays it to the master control unit 17. The master control unit 17 stops the heating unit 14a when the predetermined temperature has been reached.

The mold composite body 52 is then pushed by the push rod to the heating/pressing section 15. At the heating/pressing section 15, a predetermined high temperature is maintained by the heating unit 15a under control of the temperature sensor 15b relaying the temperature to the master control unit 17. The upper mold 21 of the mold unit is lowered a predetermined distance and presses the optical material 30 by the air-pressure driving unit 15c. Height sensor 15d detects a height of the air-pressure driving unit 15c and relays it to the master control unit 17. The master control unit 17 stops the air-pressure driving unit 15c when the predetermined depth has been reached as indicated by the pressing code 41 read by the read sensor 18. After a predetermined period of time, the driving unit is raised. As a result, the optical material 30 in the mold unit 20 is pressed and molded into the predetermined shape established by the mold surfaces 21a and 22a of the upper and lower molds 21 and 22, resepectively.

The mold composite body 52 is then pushed by the push rod to the cooling section 16. The cooling section 16 lowers the mold composite body 52 temperature to a predetermined temperature (e.g. room temperature) by cooling unit 16a under control of the master control unit 17. Temperature sensor 16b detects the temperature and relays it to the master control unit 17. The mster control unit 17 responds to the detected temperature and lowers the temperature of the cooling unit until it reaches the predetermined temperature. As a result, the molded lens in the mold composite body 52 will harden.

The carrying member 40 with the mold unit 20 are then pushed by the push rod past the shutter 5a to the unloading section 5 of the lens-molding device 100. The mold composite body 52 is then disassembled and the lens is removed from inside the mold 20.

The information and pressing code 41 placed in or on the mold unit or carrying member 40 is read by the read sensor 18. The pressing code 41 sets forth the distance the upper mold is to be lowered. This information is relayed to the master control unit 17. The air-pressure driving unit 15c of the heating/pressing section 15 is lowered and the lens element is pressed and molded by pressing it to the code-indicated predetermined position. Even if the lowering distances by the air-pressure driving unit 15c are to be different for each of the mold units, the lens-molding device 100 reads and carries out the desired pressing operations. This automatic control of the pressing stroke for each individual mold unit improves operational efficiencies and lowers the manufacturing costs of lens elements.

The general process for molding optical components of the present invention includes the steps of placing an optical material 30 in one or more mold units 20, placing the mold unit(s) in a carrying member 40, incrementally moving the carrying member 40 in a horizontal direction 13 along a predetermined path, and sequentially positioning the mold unit(s) under optical material treatment sections 14,15,16. The mold unit is heated to a predetermined temperature at the heating section 14, the optical material is pressed at the heating/pressing section 15 and the optical material is cooled at the cooling section 16. Information 41 in coded form suitable to be read by a sensor or scanner is placed in or on each mold unit or the carrying member 40. The information or code is read by the reading sensor 18. The information or code is then relayed to a master control unit 17. This unit controls the operation of the treating sections according to information provided by the information placed on the mold composite bodies.

The invention being thus described, it will be obvious that the same may be varied in many ways. For example, the invention is not limited to using only convex or concave mold surfaces, as other shapes may be molded, other optical materials than glass may be used, and other optical components, such as mirrors and prisms, may be produced. Further, although the embodiment describes molding optical components by using a lower mold, an upper mold and a guide cylinder wherein the molds are pressed in a vertical direction, other types of molds may be used. For example, an upper mold and a lower mold without a guide cylinder, or a molding device that presses the molds in a horizontal direction may be used. In general, any molding device may be used which presses a first mold and a second mold so that pressure is applied to an optical material.

In the embodiment described above, molding information is in the form of a four-bit code that expresses one bit of information using two different aperture shapes. The invention is not limited to this type of coding, as the molding information may be relayed by other means. For example, the information may be expressed using other indicia, such a difference in reflectance, difference in aperture depth, and so on. Also, the information need not be in binary form, and the amount of information may be varied. The configuration of the information reading means also can change in accordance with the types of information relayed. The information may be detected by non-contact methods, such as by using an electric field, magnetic field, or the like, or by other contact methods, such as a probe that mechanically reads information based on other indicia.

The carrying member is not necessarily required as long as a means is provided for holding a mold unit on a conveying means. In this case, pressing information and other information may be in the form of a cavity or the like located somewhere on the mold, such as an outside surface of the mold. Also, the pressing information may be read at any time prior to the beginning of pressing, for example the information may be read when the mold unit is in transit from the heating section to the heating/pressing section.

The information provided by the codes can include information on heating temperature, heating time, additional pressure, time for applying additional pressure, and the like. Further, the present invention may be configured to control the information sent to the master control unit. The present invention is also applicable to a system where pressing is carried out for a predetermined period of time at a predetermined pressure. In such a control method, a pressure sensor may provide information to the heating/pressing section and a timer (implemented either with hardware or software) may be used to provide information to the master control unit. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A molding device for forming optical components, comprising:

a mold unit;

stored information associated with the mold unit;

a scanning unit for reading said stored information;

a heating section which heats said mold unit and the stored information associated with said mold unit to a temperature above the transition temperature of glass; and a control unit for determining the length of a pressing stroke to which the mold unit is subjected in response to said stored information read by said scanning unit.

2. The molding device of claim 1, and further comprising:

the mold unit having two molds that are separated by a distance that can be varied in order to shape an optical material placed between said two molds; and a pressing unit for varying the distance between said two molds;

wherein the control unit adjusts the length of a pressing stroke of the pressing unit according to information read by said scanning unit in order to enable the mold unit to accommodate molds having different heights in order to mold differently-shaped optical components.

3. The molding device of claim 2, wherein said scanning unit inputs said information to said control unit, and said control unit is a computer.

4. The molding device of claim 3, said molding device further comprising:

a heating/pressing section, where the molds are subjected to pressing by said pressing unit, and a cooling section for cooling said mold unit.

5. The molding device of claim 4, said molding device further comprising a carrying unit for sequentially and intermittently moving said mold unit between said heating section, said heating/pressing section, and said cooling section.

6. The molding device of claim 5, wherein said information is placed on said mold unit.

7. The molding device of claim 5, wherein the information is placed on said carrying unit.

8. The molding device of claim 4, wherein the heating section includes a heater for heating the mold unit in order to transform said optical material from a solid to a plastic state, and a temperature sensor for inputting temperatures measured in said heating section to said control unit.

9. The molding device of claim 8, wherein:

the pressing unit includes a heating unit for maintaining the optical material in a plastic state;

said heating/pressing section includes a temperature sensor for relaying temperatures in said heating/pressing section to said control unit.

10. The molding device of claim 9, and further comprising a sensor for relaying the temperature of the heating/pressing section to the control unit, and wherein:

said cooling section cools said mold unit, and said control unit adjusts the temperature in the heating section, the heating/pressing section, and the cooling section in response to the information read by the scanning unit.

11. The molding device of claim 1, wherein the information associated with the mold unit includes information on pressure to be applied to said optical components and the time-duration said pressure is to be applied.

12. The molding device of claim 1, wherein said information associated with said mold unit is in binary form.

13. The molding device of claim 1, wherein said information associated with said mold unit is provided by apertures.

14. The molding device of claim 13, wherein said information is read by the scanning unit by directing light at said apertures.

15. The optical component molding method for press-molding optical material placed between a pair of molds of a molding unit, said method comprising the following steps, performed in the order indicated:

(a) measuring the height of the pair of methods of said molding unit;

(b) storing said measurement as information in or on said molding unit or a carrying member for said molding unit;

(c) scanning said information;

(d) heating said molding unit and the stored information to a temperature above the transition temperature of glass; and (e) controlling a pressing stroke length used for press-molding the optical material placed between said pair of molds by using the scanned information.

16. The method of claim 15, wherein:

in step (c), a carrying member for said molding unit is provided, and said molding unit is placed on the carrying member; and, in step (d), the carrying member is moved past said scanning unit in order to scan said information.

17. The optical component molding method of claim 15 wherein, in step (e), the scanned information is input to a computer for controlling said pressing stroke length.

18. The optical component molding method of claim 15 wherein, in step (d), the molding unit is passed intermittently and sequentially through a heating section, a heating/pressing section and a cooling section of a molding device.

19. The optical component molding method of claim 16 wherein said information includes temperatures necessary for molding said optical material and, simultaneously with step (d), the the temperatures of the molding device heating section, the heating/pressing section, and the cooling section are controlled using said information.

* * * * *

UNITED STATES PATENT AND TRADEMARK OFFICE
CERTIFICATE OF CORRECTION

PATENT NO. : 6,592,785 B1 Page 1 of 1
DATED : July 15, 2003
INVENTOR(S) : Mukasa It is certified that error appears in the above-identified patent and that said Letters Patent is hereby corrected as shown below:

<u>Column 8,</u>
Line 15, change "15. The optical" to -- 15. An optical --;
Line 19, change "pair of methods" to -- pair of molds --.

Signed and Sealed this

Thirtieth Day of September, 2003

JAMES E. ROGAN
*Director of the United States Patent and Trademark Office*